METHOD OF PREPARING PIGMENTS

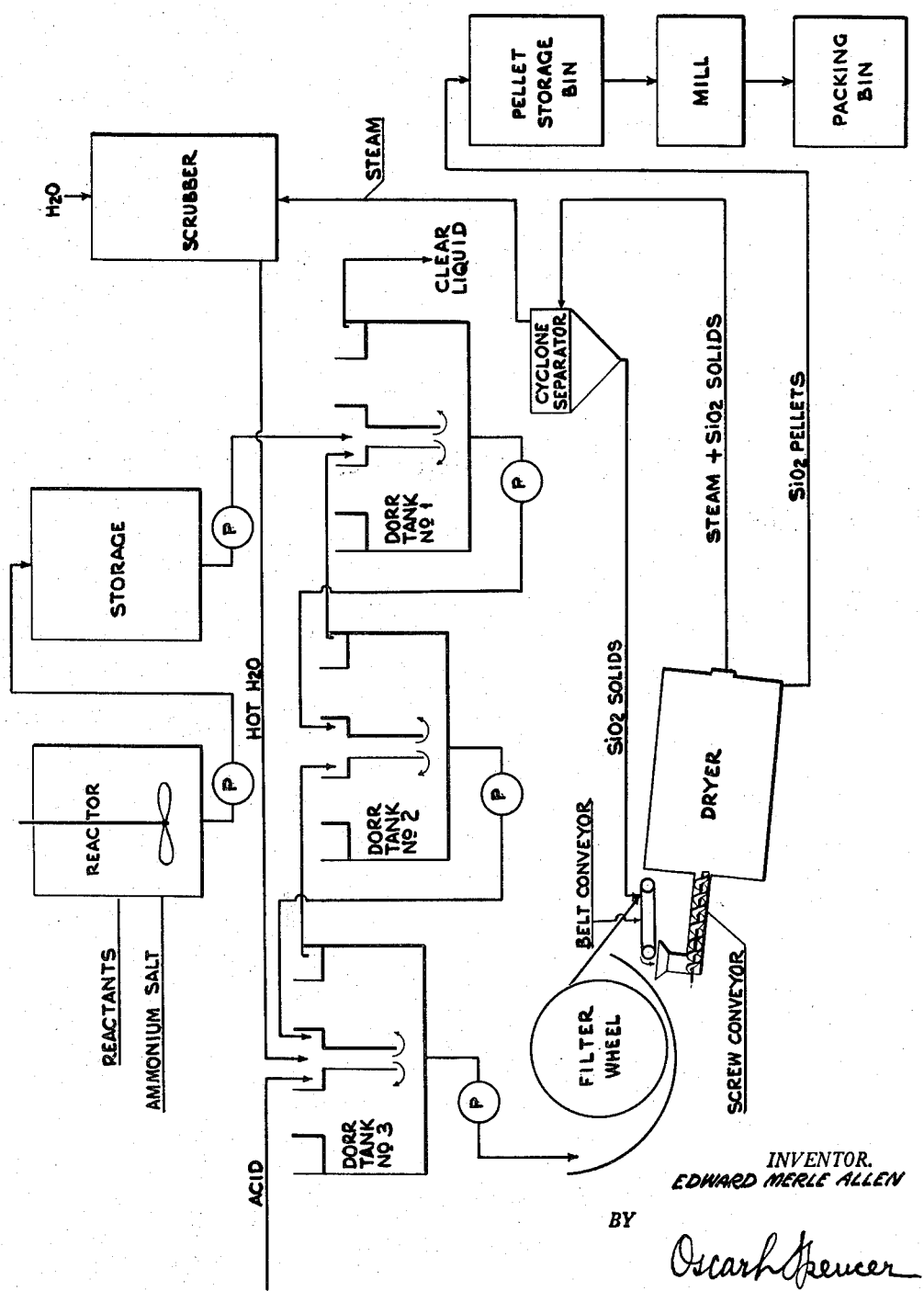

Edward Merle Allen, Doylestown, Ohio, assignor to Columbia-Southern Chemical Corporation, Allegheny County, Pa., a corporation of Delaware Application December 24, 1956, Serial No. 630,172

4 Claims. (Cl. 23—182)

The present invention relates to the preparation of finely-divided, precipitated silica and to the recovery of the silica from aqueous mixtures thereof. More particularly, the present invention concerns the recovery of silica in a dry state.

Silica can be precipitated in finely-divided form by the reaction of sodium silicate with an acid under controlled conditions of temperature, rate of addition of acid, and the like. Also, it may be prepared by reaction of finely-divided, alkaline earth metal silicate, such as calcium silicate, with acid. The silica thus obtained is in very finely-divided state having an average ultimate particle size below about 0.1 micron, usually about 0.05 micron, and a surface area above 95 square meters per gram (normally below about 400 to 800 square meters per gram). Silica which is most useful for reinforcement of rubber compositions has a surface area between about 95 and 250. Such silica is generally in the form of porous flocs of these finely-divided particles.

Following precipitation of the silica in finely-divided form, it is necessary to recover it from the aqueous medium or slurry and to dry it. Evaporation of water therefrom is excessively expensive and thus the silica is recovered initially by filtration and/or sedimentation or decantation.

Sedimentation of the slurry of silica precipitated as herein contemplated is particularly difficult when the slurry is acid. At the same time, partial or complete removal of sodium from the silica frequently is essential, particularly when the $Na_2O$ content is high, as is the case when the silica is precipitated from a solution of sodium silicate. Such removal can be effected by extraction of the silica with acid. However, separating and washing the silica becomes very slow, particularly where the pH of the resulting slurry is below about 5.

It has been found that by carefully treating an aqueous siliceous slurry, prepared as hereinabove contemplated, with a small amount of a dialkyl dimethyl ammonium chloride in which the alkyl groups contain 8 to 18 carbon atoms and washing the resulting siliceous material at a specific temperature, recovery of a purer silica is greatly facilitated.

Thus, an aqueous slurry containing finely-divided silica and prepared as defined above is treated with a quaternary halide of the type just mentioned, diluted and washed with hot water and allowed to settle in conventional thickening equipment. Clear liquor is withdrawn and the thickened slurry filtered.

Precipitated silica may be conveniently and efficiently recovered in this way from an aqueous slurry thereof. Frequently, however, the electrolytes (sodium silicate and other sodium salts) are washed from the slurry and the silica is filtered and repulped. This first filtration is usually not very difficult, especially where the silica is alkaline or above 5 in pH. However, in order to subject the silica to additional treatment, such as removal of $Na_2O$ or sodium salts, addition of cations to the silica, and the like, the washed or filtered product usually is repulped or reslurried and treated. Such a slurry is difficult to settle, especially when acid.

By careful control of the temperature, by the addition of a quaternary halide contemplated herein, etc., as described in greater detail hereinafter, settling is greatly facilitated.

Best results have been obtained using the alkyl trimethyl ammonium chlorides and the dialkyl dimethyl ammonium chlorides in which the alkyl groups contain 8 to 18 carbon atoms. Typical commercially available mixtures of such quaternary ammonium chlorides have a structure,

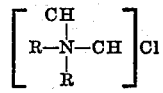

where the R groups are present in the following proportion:

| R Groups | Composition | | | | | |
|---|---|---|---|---|---|---|
| | A | B | C | D | E | F |
| Octyl-----------------percent-- | | | 8 | | 8 | |
| Decyl-----------------do---- | | | 9 | | 9 | |
| Dodecyl---------------do---- | 90 | 6 | 47 | | 47 | |
| Tetracetyl------------do---- | 9 | 93 | 18 | | 18 | |
| Hexadecyl-------------do---- | | 1 | 8 | 10 | 8 | 30 |
| Octadecyl-------------do---- | | | 5 | 10 | 10 | 70 |
| Octadecenyl-----------do---- | 1 | | 5 | 35 | | |
| Octadecadienyl--------do---- | | | | 45 | | |

Of the above, composition E has given most marked settling.

In the practice of the above process the precipitated silica treated preferably has a concentration of about 5 to 25 grams of $SiO_2$ per liter of aqueous slurry. To this slurry ammonium salt is added and the temperature regulated, as will be seen hereinafter, and the slurry allowed to settle. More concentrated slurries may be treated if desired.

The amount of ammonium salt which is used is quite small, usually ranging from about 0.05 to 1 percent by weight of silica pigment in the slurry. Larger amounts may be used but rarely offer any advantages.

As will also be seen in detail hereinafter, numerous other operating conditions are important to the successful separation of the silica contemplated from its aqueous slurry and to the efficient and economical washing of the siliceous slurry.

Having once washed and settled the siliceous solids in conventional thickening equipment, the settled solids are removed from the thickeners, at which point they have the consistency of a slurry. This slurry is then filtered preparatory to drying. Filtration is best effected at a convenient pH above or below 5 on a filter wheel, such as an Oliver filter, whereupon the slurry is reduced to a filter cake containing at least about 70 percent "free water" by weight and resembling wet snow. The cake is characteristically quite sticky.

The siliceous solids produced by the above method and methods contemplated herein contain "bound water" and "free water." The term "free water" denotes water which may be removed from the silica pigment by heating the pigment at a temperature of 105° C. for a period of 24 hours in a laboratory oven. The term "bound water" is intended to mean the amount of water which is driven off from a siliceous pigment by heating the pigment at ignition temperature, for example, 1000 to 1200° C., until no further water can be removed, minus the amount of free water in the pigment.

The amount of bound and free water in the silica herein contemplated is determined by the temperature of drying. Where the precipitated silica has been dried at a relatively low temperature, for example, 100 to 150° C., the silica contains bound water in the proportion of about 3 to 8 moles (normally about 6 moles) of SiO₂ per mole of bound water, and from about 2 to 10 percent of free water based upon the weight of the pigment.

Filtration of the slurry from the thickeners as practiced above is required, since the cost of drying the siliceous material in slurry form is virtually prohibitive. However, there are certain inherent problems in a filtration process. Because of the stickiness of the filter cake it is difficult to handle, in that much of it adheres to the equipment, particularly in transit to the drier and in the drier.

The very nature of this cake precludes loss-free handling, which circumstance, of course, results in cumbersome cleaning steps and interruption of operation. All of these difficulties substantially increase pigment recovery costs.

According to the present invention, however, these problems are substantially minimized. It has been found that these difficulties may be substantially reduced by mixing the silica-water mixture which contains 70 percent or more by weight of water with a silica-water mixture of lower water content in the range of about 20 to 50 percent by weight of free water. This may be accomplished effectively by partially drying a portion of the filter cake and mixing the partially-dry product with further filter cake to be dried.

In accordance with an effective embodiment of this invention the silica filter cake or like mixture may be heated to cause evolution of a stream of steam and tumbled or otherwise agitated to cause a portion of the silica in partially dried state to disperse in the escaping steam. The resulting steam-silica mixture may then be treated to recover the silica, for example, by passing it through a separator, such as a cyclone separator, to remove substantially all the silica solids from the steam vapor. The solids thus removed and containing about 40 percent by weight free water are returned and admixed with the sticky filter cake from the filter wheel.

The relatively solid-free steam is conducted, as will be seen infra, to a scrubber where it is used to heat additional water to be used in the thickening equipment as a medium in which to wash and settle further quantities of precipitated silica.

Admixture of the separator solids return with the filter cake has the advantage of virtually eliminating the adhesive characteristic of the cake, thus providing a siliceous material which may be handled both in transit to the drier and in the drier with a minimum of gumming and interruption of operation.

The drawing is a flow sheet of but a particular embodiment of the present invention and is by no means limiting of the scope thereof. It will be obvious to a skilled chemical engineer that the invention admits of numerous modifications which do not transcend its scope.

According to the particular embodiment of the present invention diagrammatically illustrated in the drawing, a siliceous slurry is prepared as hereinabove contemplated in the reactor and diluted therein with water to about 5–15, for example 10, grams of SiO₂ per liter of slurry. In addition, the slurry is treated with about 0.2 to 0.3 percent by weight of the quaternary ammonium chloride designated E in the above table (based upon the pigment in the slurry computed on a dry basis) to facilitate settling.

Subsequently, the resulting mixture is placed in storage, where it is removed, as needed, to Dorr tank No. 1 at a rate of 1 gallon per minute by means of a constant level tank and syphon. Dorr tank No. 1 is the first in a series of three similar tanks at graduated elevations with respect to each other, the first tank being lower than the second, and the second being lower than the third.

The slurry entering Dorr tank No. 1 is simultaneously admixed with clear liquid overflow from Dorr tank No. 2 (as shown) at a rate of 5 volumes of clear liquid for each volume of slurry. The solids in the resulting mixture settle to the bottom of Dorr tank No. 1 and are pumped therefrom to Dorr tank No. 2, where they are admixed on entering therein with clear liquid overflow from Dorr tank No. 3. Settling again takes place and the underflow in Dorr tank No. 2 is fed to Dorr tank No. 3 where it is mixed with hot water emanating from the scrubber shown in the drawing and to be discussed hereinafter. The feed rates into all the Dorr tanks are about the same in order to maintain a continuous system.

In Dorr tank No. 3, however, enough 3.5 normal hydrochloric acid is added to reduce the pH of the slurry to about 5. Although HCl is very desirable, any acid yielding a water-soluble salt in the slurry is suitable. The hot wash water added to Dorr tank No. 1 reduces the alkali in the first wash to about 3.8 grams Na₂O per liter of underflow from the tank. The NaCl content resulting from the addition of HCl in Dorr tank No. 3 is immediately greatly reduced therein by the wash water added to said tank; this washing action accounts for the fact that the slurry removed from Dorr tank No. 3 and fed to the filter wheel (shown) contains only about 1.5 grams NaCl per liter of slurry.

After thickening in Dorr tank No. 3, the silica slurry is removed as an underflow therefrom and fed to an Oliver filter, as just stated, where it is reduced to a filter cake which, in turn, is introduced into a steam-tube rotary dryer, from whence the resulting dried silica is removed to a vertical mill to produce the finished product.

As stated hereinabove, the filter cake formed on the Oliver filter wheel is difficult to handle because of its adhesive character. In the first place, it sticks to the equipment used to transfer it from the wheel to the drier. As shown in the drawing, the cake passes from the filter wheel to an endless belt and then into a trough at the bottom of which is a screw conveyor which passes the cake directly into the drier.

Quite obviously the belt, trough, screw, drier, etc., were, prior to the present invention, source of great chagrin, in view of the adhesiveness of the cake. It has been found, according to the instant invention, that this adhesiveness may be readily overcome in a very unique manner while preventing, at the same time, a substantial quantity of precipitated solids from being recycled from the drier to the thickening equipment, as stated above.

In the process of drying, such as in a steam-tube rotary drier, the water removed from the siliceous solids passes out of the drier in the form of steam. These solids being as fine as they are, it is unavoidable that a significant amount of them is entrained by the steam exiting from the drier.

The amount of silica which is entrained by the escaping steam depends upon the rate of heating and the degree of tumbling of the mixture. In general, tumbling is sufficient to cause at least about 20 percent, rarely over 90 percent by weight, of the silica introduced into the drier to be dispersed in the steam. In the particular embodiment herein discussed, about two-thirds of the silica in the filter cake is so entrained, the filter cake containing between about 8 and 25 percent by weight silica solids, for example 15 percent, the remainder (in this 85 percent) being free water.

The steam-silica mixture from the drier is conducted to a cyclone separator where the entrained solids are removed, thus liberating the steam from substantially all (about 98 percent by weight) of its entrained silica. The silica so removed contains about 20 to 50 percent by weight free water, in this instance about 40 percent, and represents slightly less than two-thirds of the SiO₂ produced in the system, i.e., the silica solids in the filter cake.

The steam removed from the separator and fed to the scrubber (as shown in the drawing) heats the water fed to the scrubber to a temperature of about 195° F. Hot water thus economically produced is employed as the wash water in the system by first directing it to Dorr tank No. 3, then to Dorr tank No. 2, etc., as shown in the drawing. Should there not be enough of this hot water for Dorr settling purposes, as is very often the case, it may be supplemented with hot water from another source to provide the amount and rate needed in the settling equipment.

Washing and thickening in Dorr tank No. 3 takes place at a temperature of about 195° F., in Dorr tank No. 2 at a temperature of about 175° F. and in Dorr tank No. 1 at a temperature of about 150° F.

The final, dry product produced by the process herein defined ranges from 6.8 to 7.2 in pH and contains, on the average, 0.12 percent ammonium salt by weight of $SiO_2$.

While the washing temperatures in the embodiment just described provide optimum results, temperatures ranging from 100° F. to 210° F. in the washing system may be employed with good results. Obviously, scrubbing of the steam emanating from the separator is so regulated as to produce a condensate or water solution having a temperature within the range just defined.

Whereas the specific embodiment described above encompasses the use of three thickening units arranged in series, that number is not meant to be restrictive, since more than three or less than three units may be employed depending on the product purity required.

Silica of the type contemplated herein may be precipitated as follows:

Example I

Sixteen hundred gallons of $Na_2O(SiO_2)_{3.3}$ containing a silicate concentration corresponding to 20.2 to 20.4 grams per liter of $Na_2O$ and essentially no salt is heated to 167±5° F. While the solution is held at this temperature, carbon dioxide gas containing 10 to 10.8 percent by volume of $CO_2$, the balance being largely nitrogen, is introduced into the solution at 1250 cubic feet per minute, the gas being at a temperature of 115 to 145° F. The carbon dioxide introduction is contained for a period of 8½ hours. Thereafter, the carbon dioxide rate is reduced to 400 cubic feet per minute and the slurry boiled for 1½ hours.

The carbon dioxide content of the slurry thus produced is 120 percent of the $Na_2O$ content thereof on a molar basis.

It will be understood that the present process may be applied to the drying of silica slurries produced by various processes, including those disclosed in my copending application Serial No. 283,721, filed April 22, 1952, now U.S. Patent No. 2,805,955, and in the application of Kissling et al., Serial No. 374,432, filed August 14, 1953. The amount of partially-dry silica added to the filter cake or like mixture to be dried depends upon the adhesive character of the cake as well as other factors. Generally, at least about one part by weight of the silica-water mixture containing 20-50 percent by weight of water is mixed per 10 parts by weight of the silica-water mixture (containing 70 percent or more of water by weight) to be dried. Other amounts which effectively reduce the adhesive character of the silica-water mixture to be dried may be added.

The temperature of drying normally is in the range of 100 to 200° C. This produces silica containing up to 10 percent (usually more than 2 percent) by weight of free water as well as bound water in the range of 2-10 percent by weight. Both bound water and free water contents may be further reduced if desired. In most cases this is not necessary.

Although the instant invention has been defined with great particularity as to specific silica-type slurries, other siliceous materials, such as finely-divided alkaline earth silicate slurries, are contemplated herein. For example, by reaching an aqueous alkali metal silicate solution with an alkaline earth metal salt at controlled conditions of temperature and concentration an alkaline earth metal silicate, such as that resulting when sodium silicate and calcium chloride are reacted, may be prepared. Purification of these alkaline earth metal silicate slurries, and the like, may be achieved in much the same way as described above with all the same advantages accruing.

While the present invention has been described in detail as to specific embodiments thereof, it is not intended that such details shall be regarded as limiting the scope thereof, except insofar as included in the accompanying claims.

I claim:

1. A method of drying a moist silica-water composition having the consistency of a filter cake, containing bound water and at least 70 percent free water by weight, and having a sticky characteristic, said silica having an average ultimate particle size below 0.1 micron and a surface area between 95 and 800 square meters per gram, which comprises mixing at least about 1 part by weight of a partially dried silica-water mixture containing bound water and about 20–50 percent free water with about 10 parts by weight of the moist silica-water composition to form an admixture of greatly reduced stickiness and free water content, heating said admixture to drive off water vapor in the form of steam and to leave a dry pigmentary silica product having a free water content below about 10 percent by weight, while simultaneously causing entrainment of a portion of the silica in the evolved water vapor, separating said entrained silica from said vapor in the form of a silica water mixture and recycling the separated silica as said partially dried silica-water mixture.

2. In the preparation of a finely divided, precipitated silica by reacting an aqueous alkali metal silicate solution with an acid in an aqueous liquid medium to precipitate therein a silica having an average ultimate particle size below 0.1 micron and a surface area between 95 and 800 square meters per gram, the improvement which comprises diluting the precipitated silica with a relatively large volume of hot water to produce a diluted slurry and allowing silica solids to settle therefrom, separating the settled solids and water to produce a relatively moist silica-water composition having the consistency of a sticky filter cake, and containing bound water and at least about 70 percent free water by weight, mixing about 10 parts by weight of said moist silica-water composition with at least about 1 part by weight of a partially dry silica containing bound water and 20 to 50 percent free water by weight to produce an admixture of reduced stickiness and reduced free water content, heating the resulting admixture and removing evolved water vapor therefrom to produce a dry pigmentary silica product having a free water content below about 10 percent by weight, the rate of said water vapor removal being rapid enough to cause entrainment of partially dry silica in said vapor, separating said partially dry silica from said vapor in the form of a silica-water mixture containing bound water and 20–50 percent free water by weight, mixing the separated partially dry silica with further relatively moist silica-water composition and heating the resulting admixture as aforesaid, feeding the vapor thus separated from the partially-dry silica into water and diluting further silica with the resulting hot water and settling the resulting slurry.

3. The process of claim 1 wherein the surface area is 95 to 250 square meters per gram.

4. The process of claim 2 wherein the surface area is 95 to 250 square meters per gram.

References Cited in the file of this patent

UNITED STATES PATENTS

| | | |
|---|---|---|
| 1,708,705 | Nielsen | Apr. 9, 1929 |
| 1,843,576 | McLure et al. | Feb. 2, 1932 |
| 1,927,313 | Hagen et al. | Sept. 19, 1933 |
| 2,290,068 | Petersen | July 14, 1942 |

UNITED STATES PATENT OFFICE

CERTIFICATE OF CORRECTION

Patent No. 2,924,510            February 9, 1960

Edward Merle Allen

It is hereby certified that error appears in the printed specification of the above numbered patent requiring correction and that the said Letters Patent should read as corrected below.

Column 1, line 70, for "pulphed" read -- pulped --; column 4, line 39, for "source" read -- sources --; column 5, line 25, strike out "since"; line 40, for "contained" read -- continued --; column 6, line 23, after "and" insert -- reduced --.

Signed and sealed this 4th day of April 1961.

(SEAL)
Attest:    ERNEST W. SWIDER

XXXXXXXXX
Attesting Officer

ARTHUR W. CROCKER
                                      Acting Commissioner of Patents